United States Patent [19]
Mosciatti et al.

[11] Patent Number: 6,005,310
[45] Date of Patent: Dec. 21, 1999

[54] BRUSHLESS LINEAR MOTOR SLIDER

[75] Inventors: Roger Mosciatti, Coram; Roy Diers, Commack; Frederick G. Moritz, Hauppauge, all of N.Y.

[73] Assignee: MFM Technology, Inc., Ronkonkoma, N.Y.

[21] Appl. No.: 09/092,948

[22] Filed: Jun. 8, 1998

Related U.S. Application Data

[63] Continuation-in-part of application No. 08/943,005, Oct. 2, 1997.

[51] Int. Cl.⁶ .............................. H02K 41/00; H02K 9/19
[52] U.S. Cl. .................................. 310/12; 310/64
[58] Field of Search ................... 310/12, 13, 14, 310/58, 59, 62, 63, 64, 65

[56] References Cited

U.S. PATENT DOCUMENTS

| | | | |
|---|---|---|---|
| 5,519,266 | 5/1996 | Chitayat | 310/12 |
| 5,723,917 | 3/1998 | Chitayat | 310/12 |
| 5,751,077 | 5/1998 | Gonzalez | 310/12 |
| 5,770,933 | 6/1998 | Larson et al. | 318/254 |
| 5,777,402 | 7/1998 | Chitayat | 310/12 |
| 5,783,877 | 7/1998 | Chitayat | 310/12 |

*Primary Examiner*—Nestor Ramirez
*Assistant Examiner*—Judson H. Jones
*Attorney, Agent, or Firm*—Lane, Aitken & McCann

[57] ABSTRACT

A brushless, linear motor is provided in which the armature coils are cast in a resin to form an armature plate. A heat sink is attached along one edge of the plate with conductive pins (e.g. aluminum pins) extending through the plate and into the heat sink. Fans, attached to the heat sink, draw air across it in order to remove heat by convection. A wireless communications link transmits commutation data and/or armature position data to a motor controller.

10 Claims, 15 Drawing Sheets

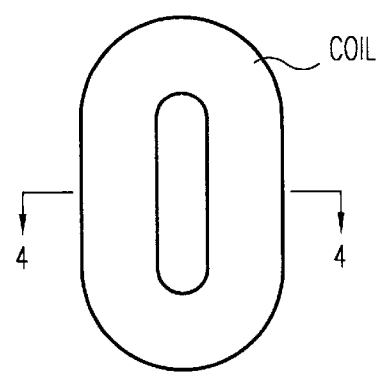
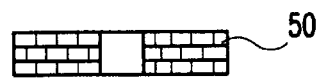
FIG.7A  FIG.7B
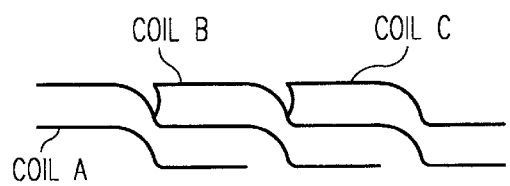
FIG.8
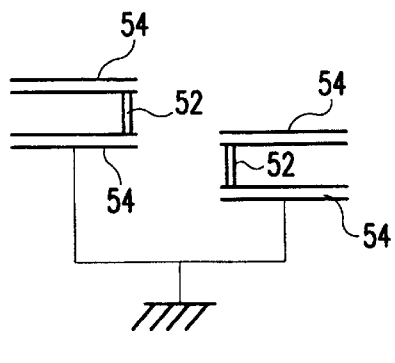
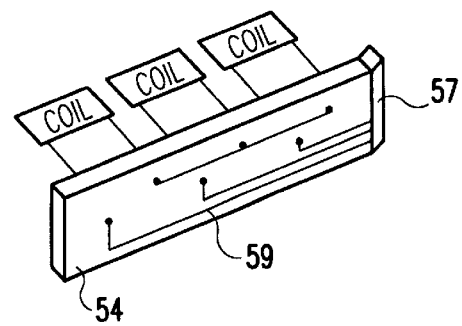
FIG.9  FIG.10

BRUSHLESS LINEAR MOTOR SLIDER

RELATED APPLICATION

This application is a continuation in part of U.S. application Ser. No. 08/943,005 field Oct. 2, 1992.

BACKGROUND OF THE INVENTION

1. Field of the Invention

This invention relates to improvements in brushless, linear motors.

2. Description of the Prior Art

As will be appreciated by those skilled in the art, there is a growing commercial use of high performance, brushless linear motors in various applications. One recognized disadvantage of prior art brushless motors is the cumbersome umbilical wires that connect. the moving armature (also referred to in the linear motor art as the slider) to the controller and power source. For example, the umbilical for a prior art three-phase, brushless motor has three power lines, five signal lines for the armature commutating signals, and eight signal lines for armature position signals. Another disadvantage is the need to remove heat from the moving armature. Where a coolant is used, the umbilical includes, in addition to the wires, a tube to carry the coolant to a coolant coil embedded in the armature and a tube to carry the coolant from the coil. The result is a heavy, cumbersome, umbilical of wires and tubes, festooned along the path in which the armature moves.

SUMMARY OF THE INVENTION

An object of this invention is the provision of a brushless, linear motor with a small number of umbilical Another object of this invention is the provision or a brushless, linear motor with a thermally efficient armature cooling system that eliminates the need for coolant coils.

A further object of the invention is the provision of an improved armature coil and a method of making the armature coil.

Briefly, this invention contemplates the provision of a brushless, linear motor in which the armature coils are cast in a resin to form an armature plate. A heat sink is attached along one edge of the plate with conductive pins (e.g. aluminum pins) extending through the plate and into the heat sink. Fans, attached to the heat sink, draw air across it in order to remove heat-by convection. A wireless communications link transmits commutation data and/or armature position data to a motor controller.

In one embodiment of the invention, a rectangular wire is used to wind each individual coil. Adjacent coils may be partially overlapped, or not overlapped, as desired. A printed circuit board interconnects the armature coils and connects them to the external power wires. The form on which the coils are wound can be used to support the coils during their encapsulation.

Power to the armature coils can be implemented by a six-step; two wire system with auxiliary power for the electronics provided as taught in U.S. Pat. No. 5,317,245, or as taught in U.S. Pat. No. 5,773,941, both of which are incorporated herein by reference. Alternatively, a three-wire, three-phase, sinusoidal armature drive may be used as auxiliary electronics power again provided as taught in U.S. Pat. No. 5,317,245 or U.S. Pat. No. 5,773,941. In either the two wire six-step or three wire, three phase systems, the fans may be powered from the same two or three wires that power the armature coils. Power to the fans and resultant fan speed is automatically proportional to armature current and the fan need not be powered when the armature is at rest.

In the three-phase embodiment of the invention, control amplifiers located remotely from the motor generate a three-phase, sinusoidal armature drive signal, which is controlled in response to the armature commutation and armature position signals. Only three wires are used in the umbilical to couple both the three-phase drive current to the armature coils and to couple, through a d.c. to d.c. convertor, current to power the fans.

BRIEF DESCRIPTION OF THE DRAWINGS

The foregoing and other objects, aspects and advantages will be better understood from the following detailed description of a preferred embodiment of the invention with reference to the drawings, in which:

FIG. 7A as a plan view of an armature coil.

FIG. 7B is a sectional view of an armature coal wound with rectangular wires.

FIG. 8 is a side view of an overlapping, three-coil armature subassembly;

FIG. 9 is a schematic side view of a form for forming the coils shown in FIG. 7.

FIG. 10 is a schematic view of a printed wiring board used to interconnect the armature coils and to connect the armature coils to the external power source.

DETAILED DESCRIPTION OF A PREFERRED EMBODIMENT OF THE INVENTION referring now to FIGS. 1, 2, 3, 4 and 5, the brushless, linear motor, in this illustrative embodiment of the invention, has a U-shaped stator 10. A series of permanent motor art as a slider) is adapted to move back and forth in the stator 10, An armature 18 (also referred to in the linear motor art as a slider) is adapted to move back and forth in the space between the magnets 12 and is mechanically supported by any one of a number of suitable prior art structures (not shown). As will be appreciated by those of ordinary skill in the art, the linear motor thus far described is representative of prior art brushless, permanent magnet linear motors.

Figure 4:
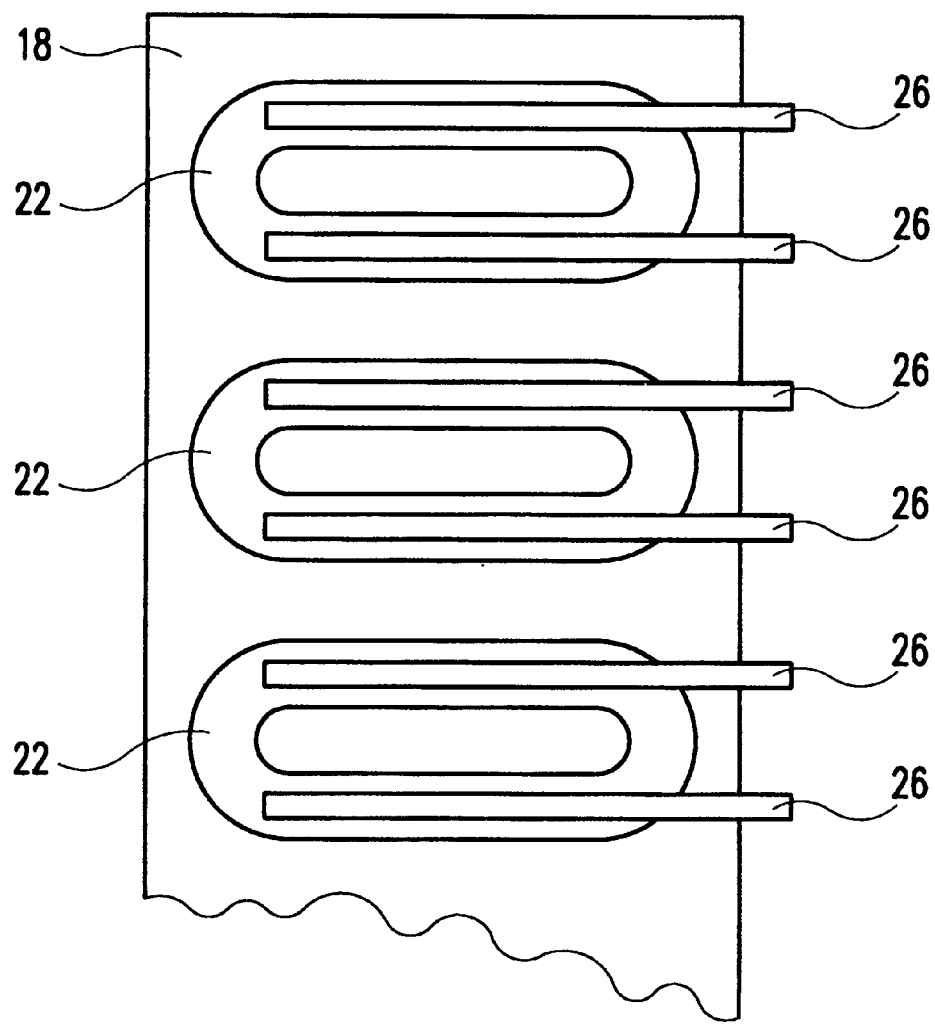
FIG. 4 is a plan view of the slider shown in FIGS. 1, 2 and 3.
Figure 5:
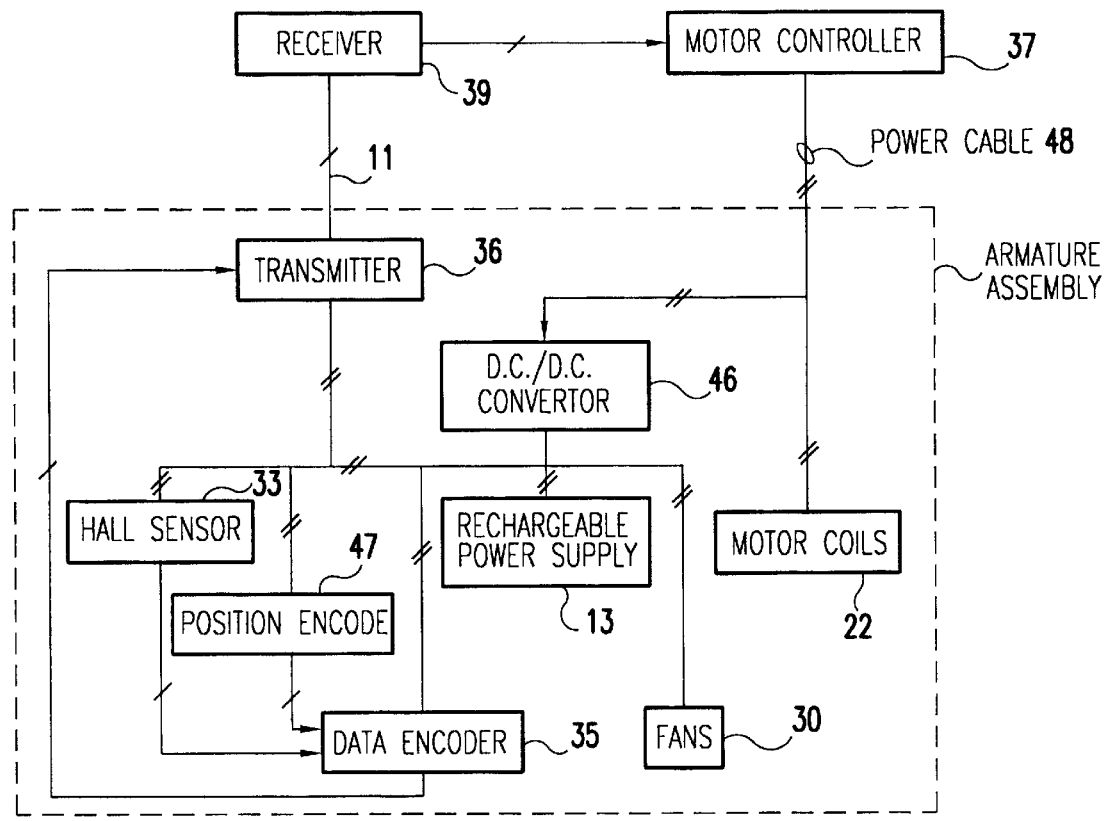
FIG. 5 is a function block diagram showing electronic and power connections among the motor system components shown in FIG. 1–4.

In accordance with the teachings of this invention, the armature 18 is comprised of a cast resin armature plate 20 in which armature coils 22 are embedded; for a three phase motor, typically six coils are used three of which are shown in FIG. 4, in a nonoverlapping arrangement, but, as will be appreciated by those skilled in the art, they could be disposed in an overlapping position. The cast resin armature plate is formed with a suitable thermally conductive resin. A heat sink 24, made of a suitable thermally conductive material (e.g. aluminum) is attached by a heat conductive epoxy to one edge of the cast resin armature plate 20. Preferably, the plate 20 fits snugly in a slot in the heat sink in order to provide an extensive contact area between the plate and the heat sink. Thermally conductive pins 26 help conduct heat from the armature coils 22 to the heat sink and also help secure the armature plate to the heat sink. One end of each thermally conductive pin 26 extends into the cast resin plate 20 and the other end extends into the heat sink 24. To make the armature assembly more rigid, hard plastic covers could be placed over and under the armature plate 20 and held in place by an epoxy applied through openings in the covers.

One or more fans 30 (here three fans), attached to the outboard surface of the heat sink 24, move air across the heat sink to help cool it and thereby aid in heat transfer away from the armature coils. The heat sink 24 has fins 31 to aid in heat removal by providing an additional surface area over which air passes.

Sensors 33 (e.g. Hall effect sensors), embedded in the armature plate 20, generate commutating signals indicating the position of the armature coils 22 relative to the stator permanent magnets 12. As will be appreciated by those skilled in the art, these commutating signals are used to control sequential switching of power to the armature coils. In this three-phase embodiment of the invention, there are three commutation position sensors 33 (e.g. three Hall effect sensors). An armature position encoding sensor 47 is mechanically attached to the armature assembly. The armature position encoder may be, for example, an optical encoder.

An encoder/multiplexer 35 is attached to the armature assembly, here it is attached to the heat sink 24. A wireless transmitter 36 (e.g. rf or ir) is also attached to the heat sink 24. Commutation signals from the sensors 33 and armature position signal from the armature position encoder 47 are coupled to the encoder/multiplexer 35, whose output is coupled to the transmitter 36. Obviously, the encoder/multiplexer function and the transmitter function can be combined in a single electronic package. The transmitter 36 transmits the commutating signals over a wireless, serial communication link 11 to a receiver 39, whose output is coupled to a motor controller 37. The armature position transducer 47 signals, which indicate the position of the armature, are multiplexed with the commutating signals, and transmitted over the serial channel 11 to the motor controller 37, where they are demultiplexed, decoded, and used to control the power to the armature coils.

U.S. Pat. No. 5,317,245 discloses the basic two wire concept for brushless motors. In the two wire concept, the commutation switches and the commutation switch logic are physically located with the motor armature. The power to operate the switches and logic are derived from the same two wires that provide the drive current to the armature coils. With linear control, a which frequency signal on the two wires provides power for the commutation switch and switch controls. With certain pulse width modulation control systems, an auxiliary source for the commutating switch and controls is not necessary. U.S. Pat. No. 5,773,941 discloses a two-wire, brushless, linear motor with armature commutation switches and control logic mounted on the moving armature assembly and powered by the same two wires that power armature coils. Here, a rechargeable supply is provided for the conditions when power is not available from the two wires.

While the two-wire brushless motor is advantageous in that it reduces the umbilical to two wires, the two-wire system provides a stepped (e.g. six step) commutated armature voltage, which is less desirable than a sinusoidally commutated waveform. The six step commutation produces a force ripple while driving the armature coils with a sine wave produces a constant force. However, with a sinusoidally commutated armature current, the armature control amplifiers are advantageously located remotely from the armature.

The invention is applicable to two-wire six step systems three-wire, six step systems and to three wire, sinusoidal systems. With the three wire, three phase sinusoidal armature drive, or two or three wire six step armature drive, power for the fans can be taken from the armature power wires via a d.c. convertor 46 mounted on the armature assembly. The output of the convertor 46 can also be used to power the commutation electronics; i.e. armature position electronics, the encoder/multiplexer electronics, and the transmitter. With a linear power control and certain pulse width modulated (PWM) controls, a rechargeable power source 13, such as a rechargeable battery, can be used to supply power to these components when the armature is at rest, as taught if application Ser. No.08/742,821. Alternatively, a high frequency signal can be used to provide power to the electronic components as taught in U.S. Pat. No. 5,317,245. As more fully explained in U.S. Pat. No. 5,312,245, with a balanced PWM control, power is available on the armature cower wires to power the electronic components (and fans if desired) even when the armature is at rest and the rechargeable battery or other auxiliary source is not needed to provide power.

In operation, the transmitter 36 transmits the armature position commutating signals from sensors 33 and the armature position signals from a transducer 47 (e.g. an optical position encoder) serially over a single, preferably wireless, communication channel 11 to the motor controller 37. An umbilical 42 comprised of three power wires connects the controller 37 to the armature coils 22. The power wires 42 are also connected to the input of the d.c. to d.c. convertor 46, secured to heat sink 24. The output of convertor 46 provides power to the fans 30, to the commutating sensors 33, to the armature position sensor 47, the encoder/multiplex 35 the transmitter 36, and a rechargeable power supply 48.

Here it will be appreciated fans 30 do not need to be powered when the armature is at rest since no heat is generated by the armature. However, the position sensors, the multiplexer and the transmitter should be powered when the armature is at rest. Power for the electronics can be supplied by a rechargeable battery, as disclosed in the aforementioned U.S. Pat. No. 5,773,941, or as disclosed in U.S. Pat. No. 5,317,245, depending on the control method employed, or if desired over a separate pair of wire Referring now to FIG. 6, it shows an alternate design of an armature assembly, which may be used in place of the armature plate 20 in the linear motor shown and described in connection with FIGS. 1–5. In this alternative design, armature coils 80 are wound on a laminated, magnetic structure 82, such as structure of steel laminates. The gap between adjacent armature coils is bridged by a thin piece 84 of the magnetic structure 82 (e.g. the bridge 84 is on the order of the thickness of a single laminate, about 0.05 inches) This thin bridge 84 becomes magnetically saturated, providing a sufficiently high magnetic reluctance in the path between adjacent coils so as not to substantially reduce the interaction between the coils 80 and the permanent magnets 22. At the same time, the magnetic bridge 84 smooths the magnetic transition between adjacent coils 80, thereby reducing or eliminating motor clogging without the need to skew the lamination structure or the permanent magnets.

The coils are encapsulated with a thermally conductive compound 86. This encapsulating compound 86 is in intimate thermal contact with the coils 80 and a carriage structure comprised of a back iron plate 90 and a heat sink 92 (for example, an aluminum plate). A fan 30 (not shown in FIG. 6) may be attached to the heat sink 92. Here it will be appreciated the encapsulating compound provides a large thermal cross-section between the coils 80 and the armature carriage. A keeper 94 and bolts 95 secure together the heat sink, back iron plate, and the coil carrying lamination structure.

Referring now to FIGS. 7A and 7B, each armature coil 22 is preferably formed from rectangular or square wires 50, for example copper wires. Rectangular or square wire allows the coils to be formed with less air space between adjacent conductors than can be formed with round conductors, which contact one another only at their tangent points. The air spaces in conventional coils, using round wire, impede the transfer of heat from the interior of the coil, particularly where the coils are embedded in a cast resin armature plate. Further, square or rectangular wire coils with the same number of turns as a round wire coil will have a lower resistance, resulting in a lower heat generation for the same current or a larger force for the same amount of heat generated. Preferably, the rectangular wire is coated with a thin, heat sensitive, insulating coating so that the wires bond together when the coil is heated (e.g. in an oven), forming a coil component that can be handled easily.

Referring to FIGS. 9 and 10, with the square or rectangular wire, each layer of the coil can be wound around pins 52 acting in combination with parallel plates 54. In a three-phase armature, adjacent coils can be overlapped, as shown in FIG. 7, and the winding fixture has parallel plates positioned such that the opposite sides of the coil are in different, but parallel, planes as shown in FIG. 8.

Multiple coils (overlapped or not overlapped) can se interconnected by a printed wiring board 36, as shown in FIG. 9. The board is preferably embedded in the cast resin armature plate 20, and has a connector 57 through which a connection is made to the external power source (controller 37) via the umbilical wires 42 and the regulator 46.

As previously explained, the commutating sensor outputs and the armature position sensor output are multiplexed and transmitted on a serial data communications channel, preferably a wireless channel. Using a wireless, multiplexed channel for the armature commutation data and the armature position data allows the motor to operate with a two-wire umbilical and a six-step trapezoidal drive, or a three-wire umbilical and a sinusoidal drive. If a hardwired multiplexed channel were used to transmit the commutation data and position data, it would add only two wires to the umbilical.

In the preferred wireless embodiment of the invention, the transmitter 36 carried by the armature transmits to a stationary receiver 39, whose output is coupled to the motor controller 37. Radio frequency (rf) and infrared (ir) are two examples of transmitter/receiver systems that may be used in the practice of the invention.

Figure 11:
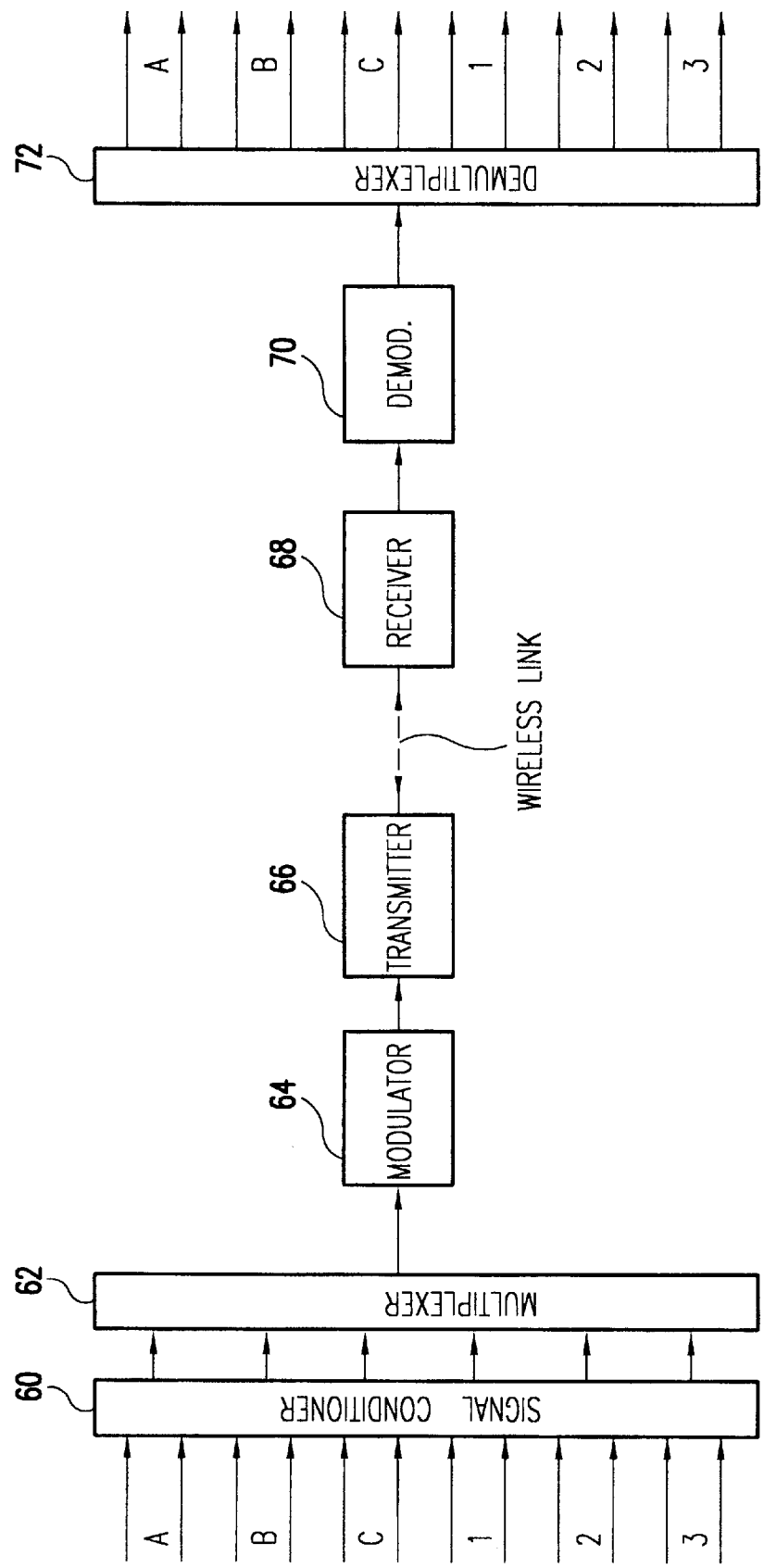
FIG. 11 is a block diagram of a single channel system for transmitting armature commutating and position data to the motor controller.

FIG. 11 illustrates one specific example of a wireless transmitter/receiver system to transmit commutating and position information to the motor controller. Referring to FIG. 10, three commutation inputs A, B and C from sensors 33, carried by six wires (i.e. three two wire pairs) are coupled as inputs to a signal conditioner 60, which here serves as a first stage of the multiplexer. Also coupled as inputs to conditioner 60 are three inputs (1, 2 and 3) from the armature position sensor 47 (i.e. six wires three, two wire pairs). The conditioner 60 converts the binary, high or low value inputs to one or the other of two predetermined voltage levels, for example by periodic sampling or by edge detection of the inputs. The outputs of the conditioner 60 are coupled as inputs to a parallel-to-serial multiplexer 62. Suitable prior art parallel-to-serial multiplexing systems include time division multiplexing, where the binary values are periodically transmitted in frames with each signal assigned a time slot in the frame. A modulator 64 modulates a carrier (e.g. radio frequency or infrared) with the output of the multiplexer 62 and transmitter 36 transmits the multiplexed commutation and position signals as serial data stream to a receiver 39. A demodulator 70 demodulates the received signal and couples it to a demultiplexer 72, which converts the serial binary values to parallel outputs A, B, and C corresponding to the inputs A, B, and C, respectively, and to parallel outputs 1, 2, and 3 corresponding to inputs 1, 2, and 3. These outputs are coupled to the motor controller 37.

Referring now to FIGS. 12, 13, 14, 15, 16 and 17, one end turn 90 or each coil in the slider assembly is placed in a recess 92 in a heat conducting slider base or block 94, preferably an aluminum block. The wall 96 of each recess 92 is contoured to match the contour of the end turn (e.g. semicircular or U shaped) placed in it, with a narrow gap 98 between the wall and the side of the coil. Electrically non-conducting spacer tubes 100 can be used to maintain a desired uniform narrow spacing between the wall and the coil prior to filling the gap with a heat conducting resin. The recess is preferably deeper than the coil is thick and additional spacers 102 position the coil away from the bottom surface of the recess and away from the inner surface of a metal cover 104, forming a gap on either side of the coil. The cover and base are mechanically joined. Of course, the metal cover could also be recessed, if desired, although this would add some complexity and expense. All the narrow gaps between the end turn of the coil and the base and between the coil and the cover are filled with the heat conducting resin 101 in order to provide a path with good thermal conductivity to dissipate heat from the coil into the surrounding base and cover.

Figure 13A:
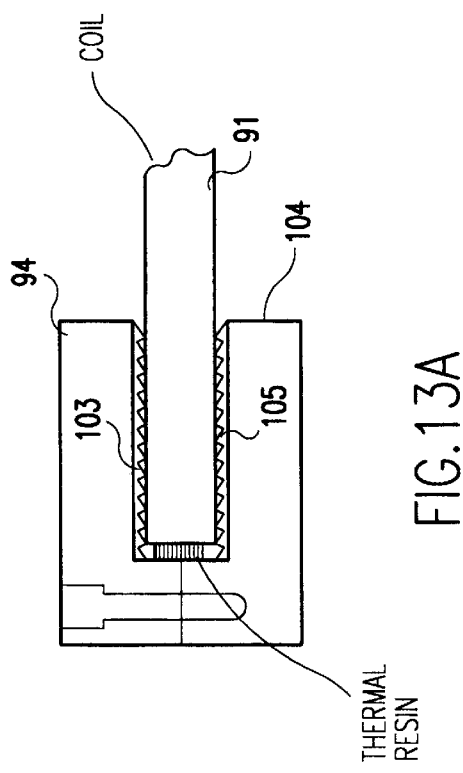
FIG. 13a is a side view similar to FIG. 13 but showing the use of thermally conductive pads.
Figure 12:
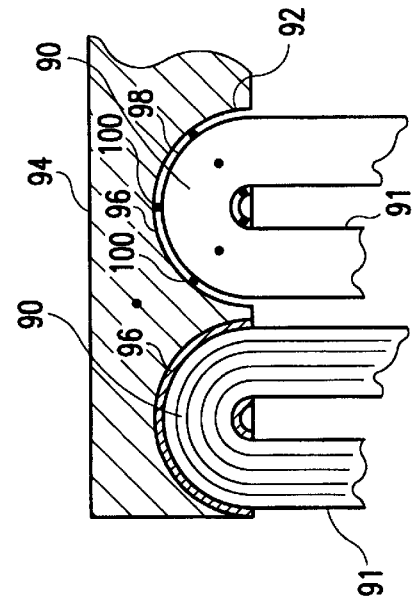
FIG. 12 is a partial sectional view of the improved coil assembly in accordance with the teachings of this invention.
Figure 13:
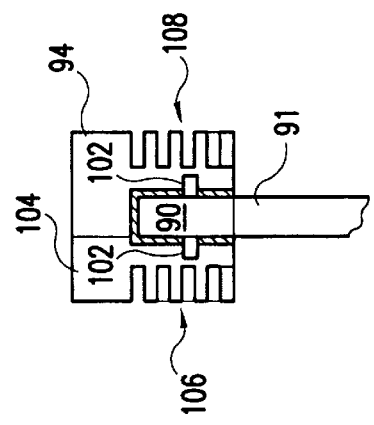
FIG. 13 is a side view of the assembly as shown in FIG. 12.
Figure 15:
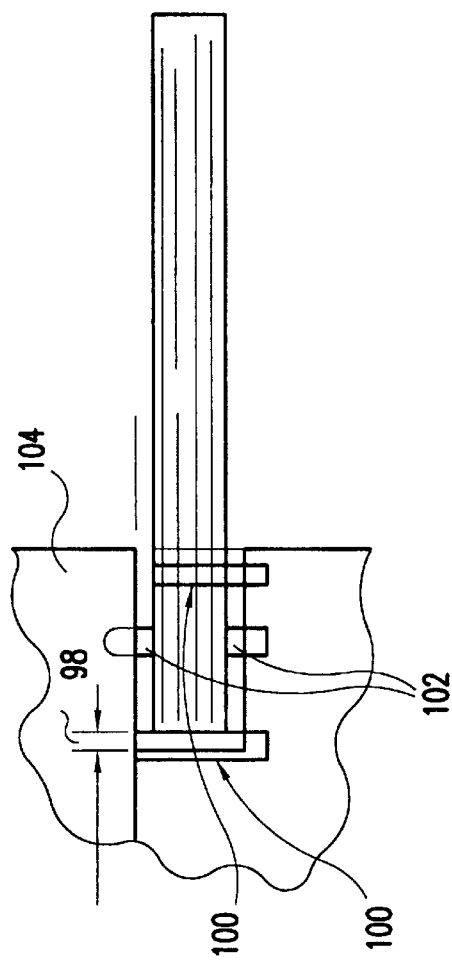
FIG. 15 is a more detailed sectional view of the assembly as shown in FIG. 12.
Figure 14:
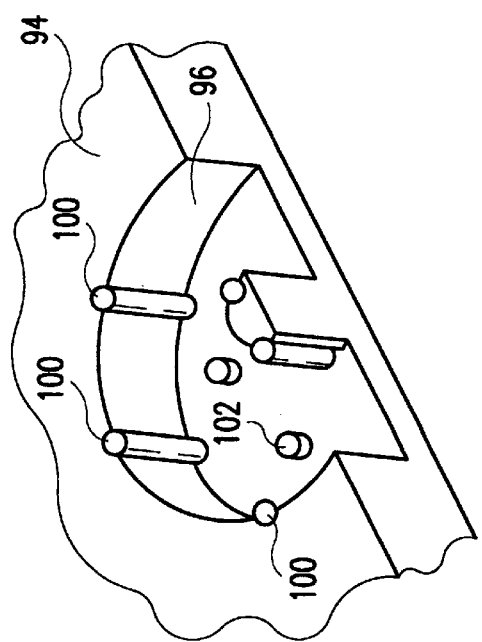
FIG. 14 is a partial perspective view of the slider heat sink with the coil removed.
Figure 17:
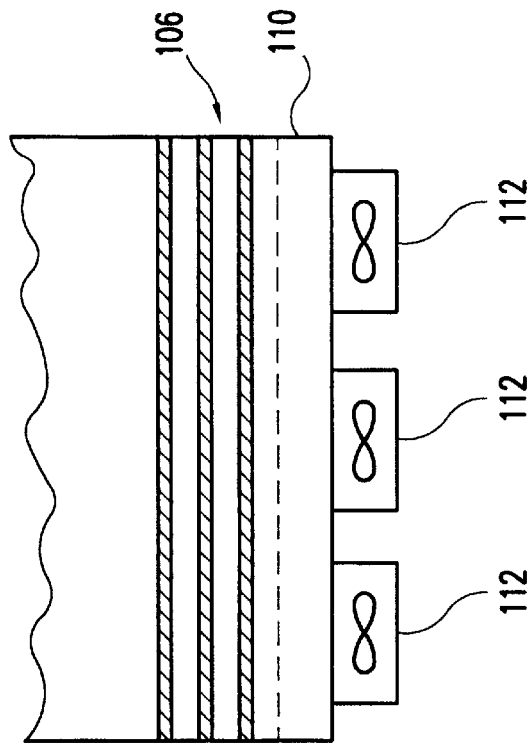
FIG. 17 is a top view of the assembly as shown in FIG. 16.
Figure 16:
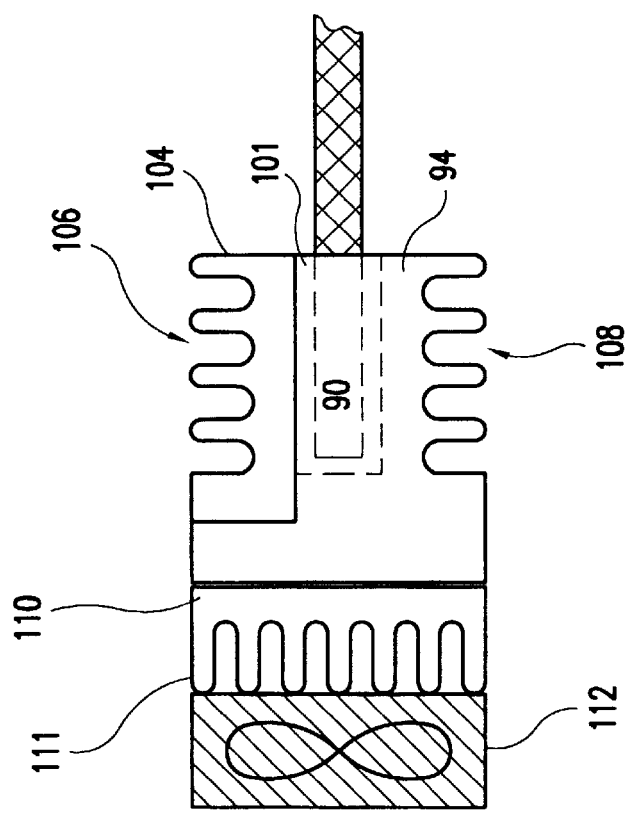
FIG. 16 is a sectional view of a coil assembly and heat sink in accordance with this invention.
Figure 19:
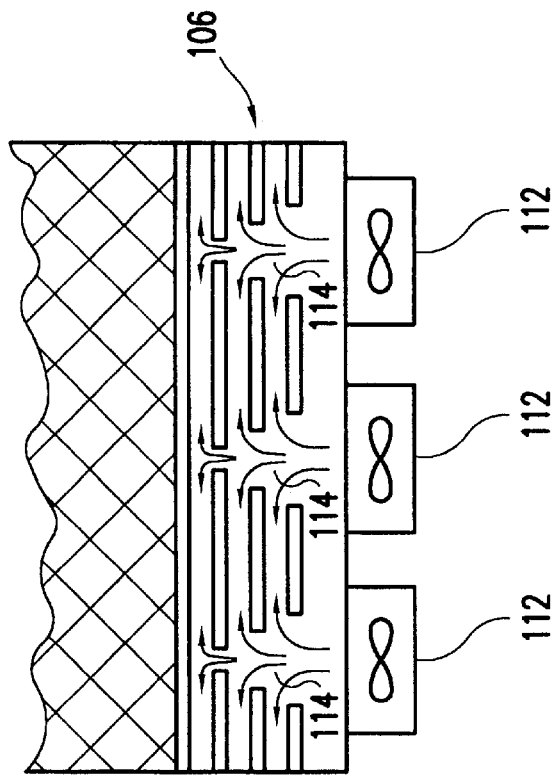
FIG. 19 is a top view of yet another embodiment of the invention.
Figure 18:
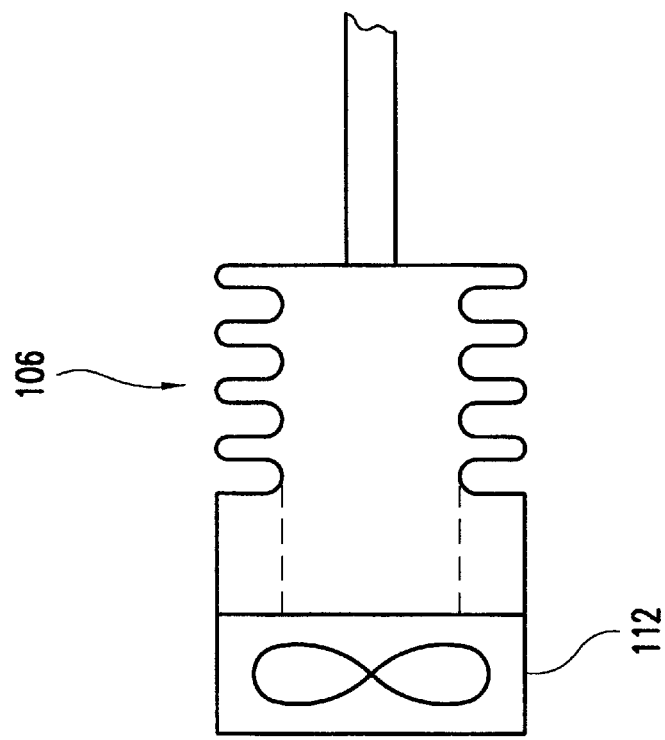
FIG. 18 is an alternative embodiment of the invention as shown in FIGS. 16 and 17.

As most clearly shown in FIGS. 13 and 16, the base and cover form a heat sink and preferably have upper fins 106 and lower fins 108 oriented so that in the operation of the linear motor, as the slider moves back and forth, air moves through the spaces between the fins, conducting heat away from them. With respect to the coil, it will be appreciated that the fins are upstanding with respect to the plane in which the coil legs lie and are oriented at right angles to the legs of the coil.

As shown in FIG. 13*a*, resilient conductive pads 103 and 105 can be used in place of th resin 101. The thermal conducting of such commercially available pads (e.g. X) may be higher than that attainable with the resin 101. The pads 103 and 105 can be squeezed between the blocks 94 and 105 and the coil 91. The coil and blocks can be dementioned as to permit the pads to be inserted but with a resultant tight assembly. Thermal resin 107 may be used for structural rigidity and added thermal conductivity.

A secondary heat sink 110 (e.g. another aluminum block) can be secured to the heat sink formed by the base and cover, preferably with a thermally conducting grease in the interface between the two heat sinks. The secondary heat sink 110 has fins 111, also so orientated that air passes along the fins as the slider moves back and forth in the operation of the motor. Fans 112 can also be located outboard of the secondary heat sink 110 to force additional air across the fins 111.

Figure 21:
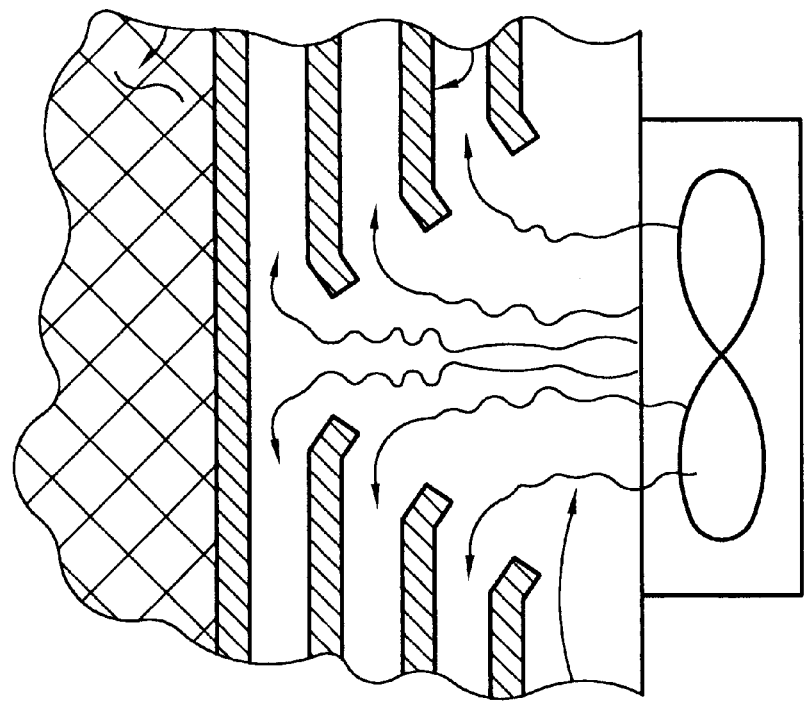
FIGS. 21 and 22 show modified versions of the invention shown in FIGS. 19 and 20.
Figure 20:
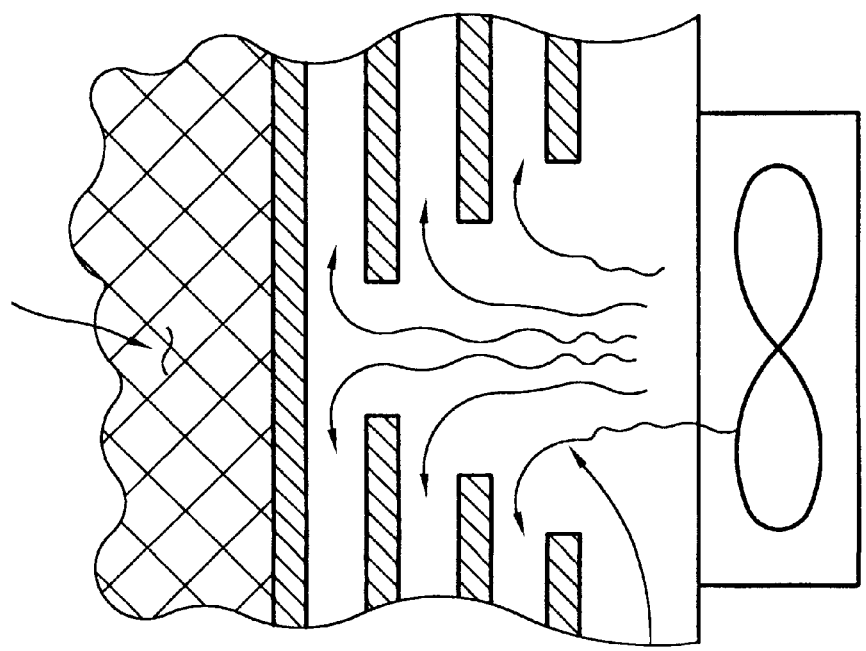
FIG. 20 is a fragmentary bottom view of the embodiment of the invention as shown in FIG. 19.
Figure 22:
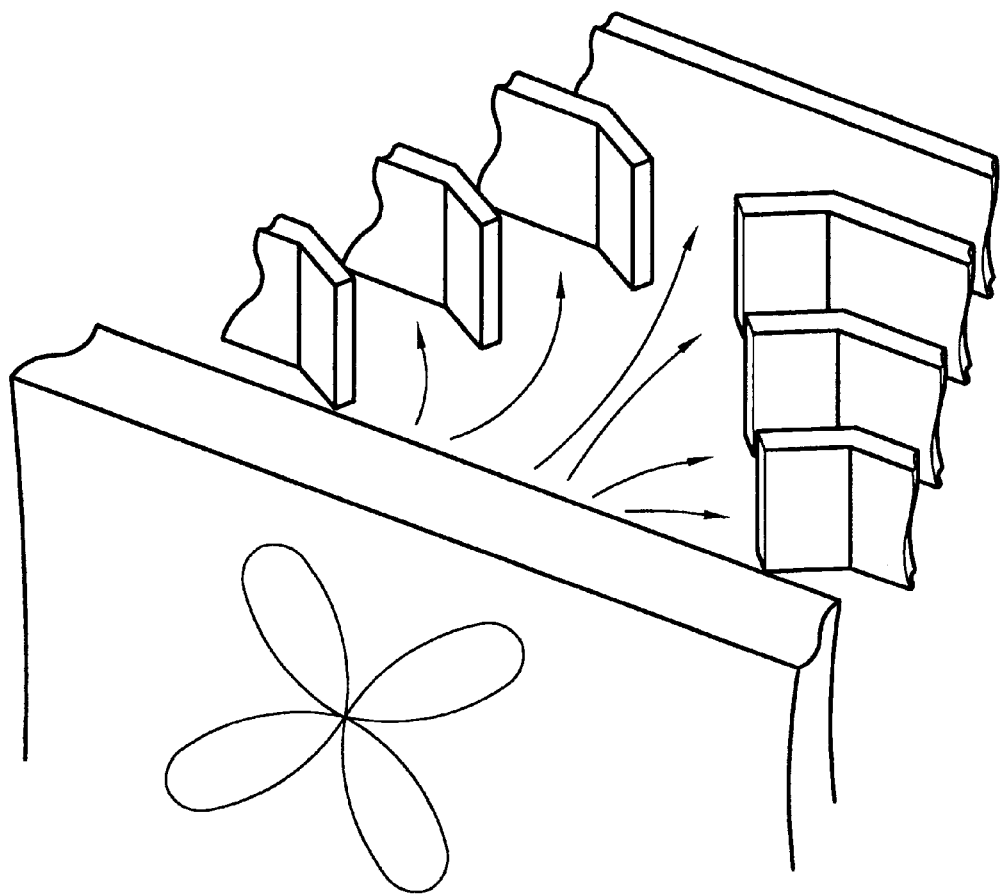

Referring now to FIGS. 18, 19, 20 and 21, fans 112 can be used in combination with only a primary heat sink if desired to reduce the width of the slider. In this case, notches 114 are cut in the fins adjacent the fans so that the fans can force air into the groves between the fins. Here, it should be noted that the notches decrease in width as they recede from the fan. FIGS. 21 and 22 show an embodiment in which the end fins adjacent the notches are angled toward the fan in order to channel air into the groves between the fins.

Figure 1:
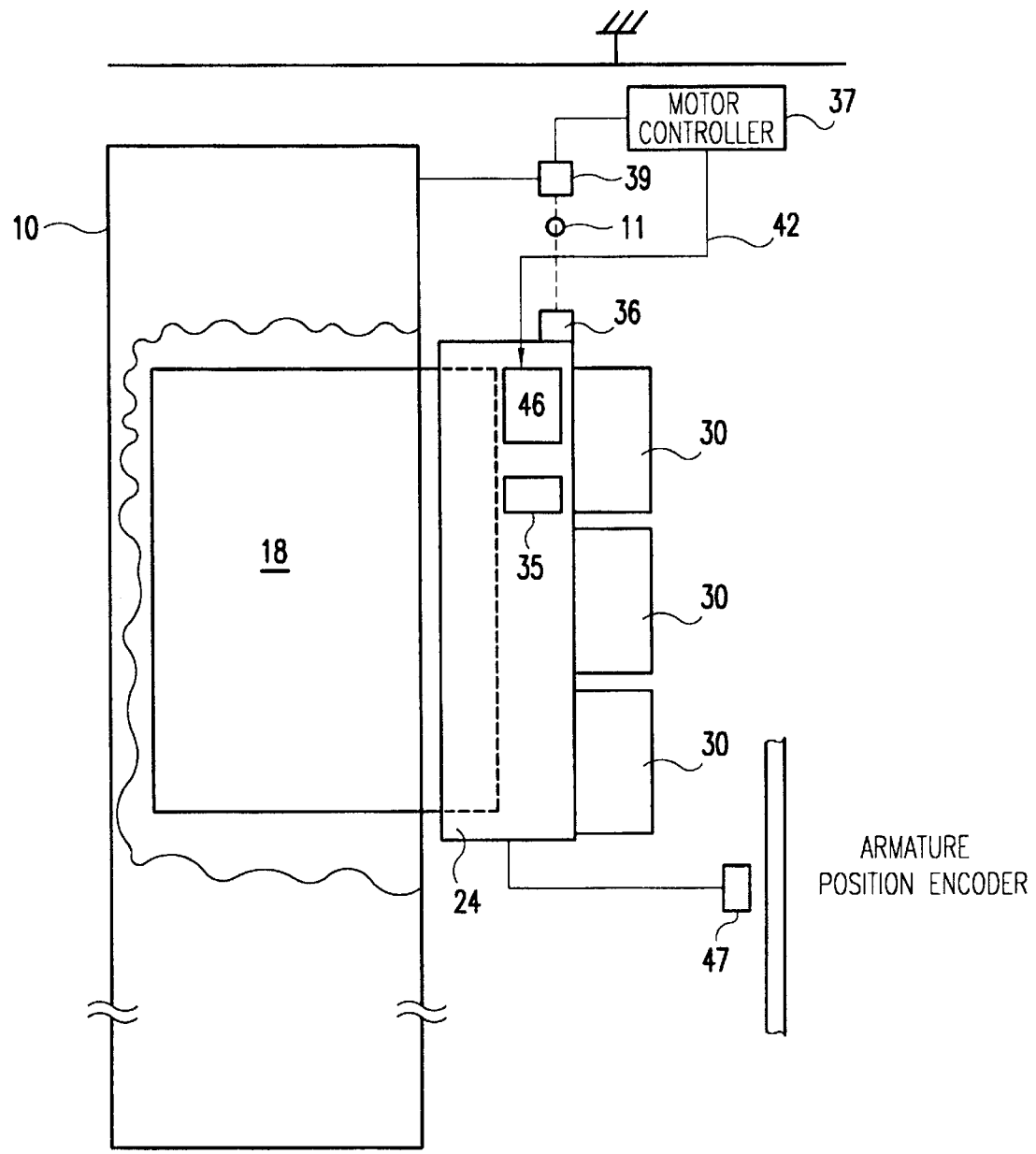
FIG. 1 is a schematic plan view, with parts broken away, of one embodiment of a brushless, linear motor in accordance with the teachings of this invention.
Figure 2:
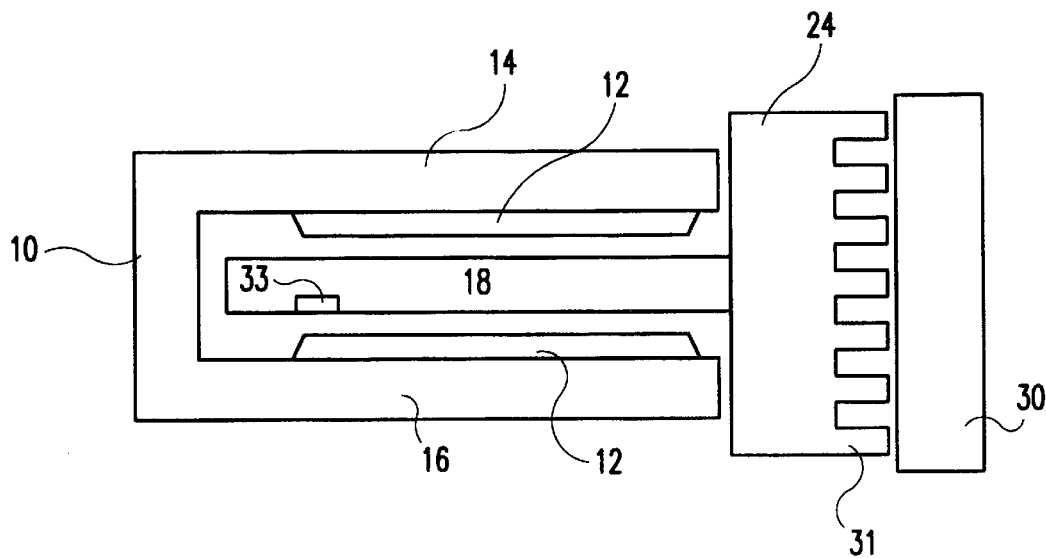
FIG. 2 is a partial end view of the motor shown in FIG. 1.
Figure 3:
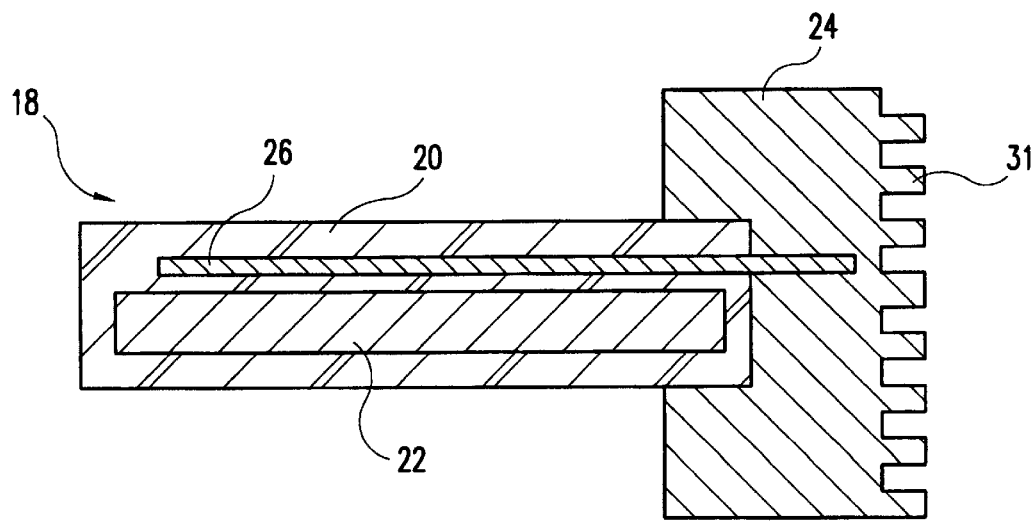
FIG. 3 is a partial sectional view of the armature and heat sinks shown in FIGS. 1 and 2.
Figure 23:
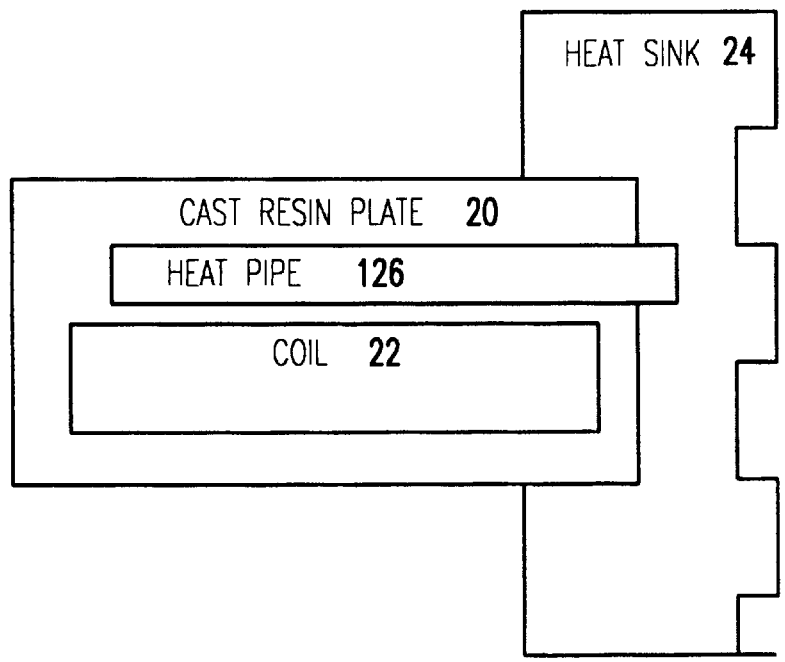
FIG. 23 is a side view of an embodiment of the invention using a heat pipe to conduct heat from the slider coils.

FIG. 23 is similar to FIG. 3 and shows the use of heat pipes 126 embedded in a slider in place of coping rods 26 to conduct heat from the coils to a suitable heat sink or other condenser, preferably air cooled. Heat pipes have traditionally been used to cool aircraft power supplies and densely packed electronics in portable computers. As prices fall, they are finding their way into more applications, including motor drives. One particular type of heat pipe is manufactured by Thermacore Inc., Lancaster, Pa. Pipe 12 consists primarily of a porous material soaked in a low vapor-point liquid such as acetone or methanol. When the liquid heats, it vaporizes and is forced to the center of the pipe. It then travels to one end where it condenses and releases its heat. At that point, the cooled liquid is wicked back to where it started, and the process repeats.

Figure 24:
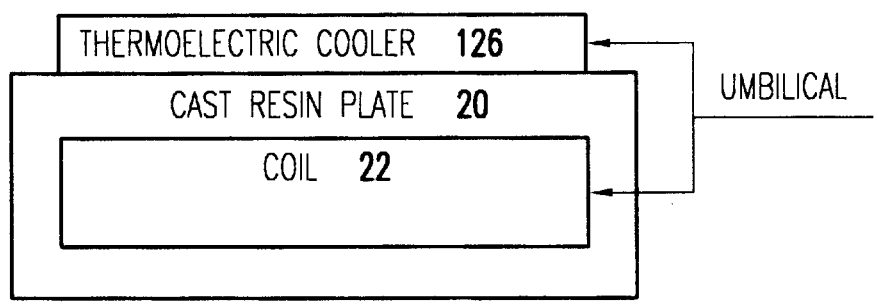
FIG. 24 is a side view of an embodiment of the invention using a thermoelectric cooler module.

FIG. 24 is also similar to FIG. 3 shows the use of a thermoelectric cooler 18 attached to the slider in order to transfer heat from the coils. The thermoelectric cooler 124 is preferably powered from the same umbilical wires that provide power to the coils, the electronics, and the fans, if any. Here it should be noted that thermoelectric modules, such as those commercially available from Melcor, Inc. can be used to provide cooling up for the slider, by placing the module on the slider. In addition, heat pipes can be embedded in the slider and used to remove heat from it.

Figure 6:
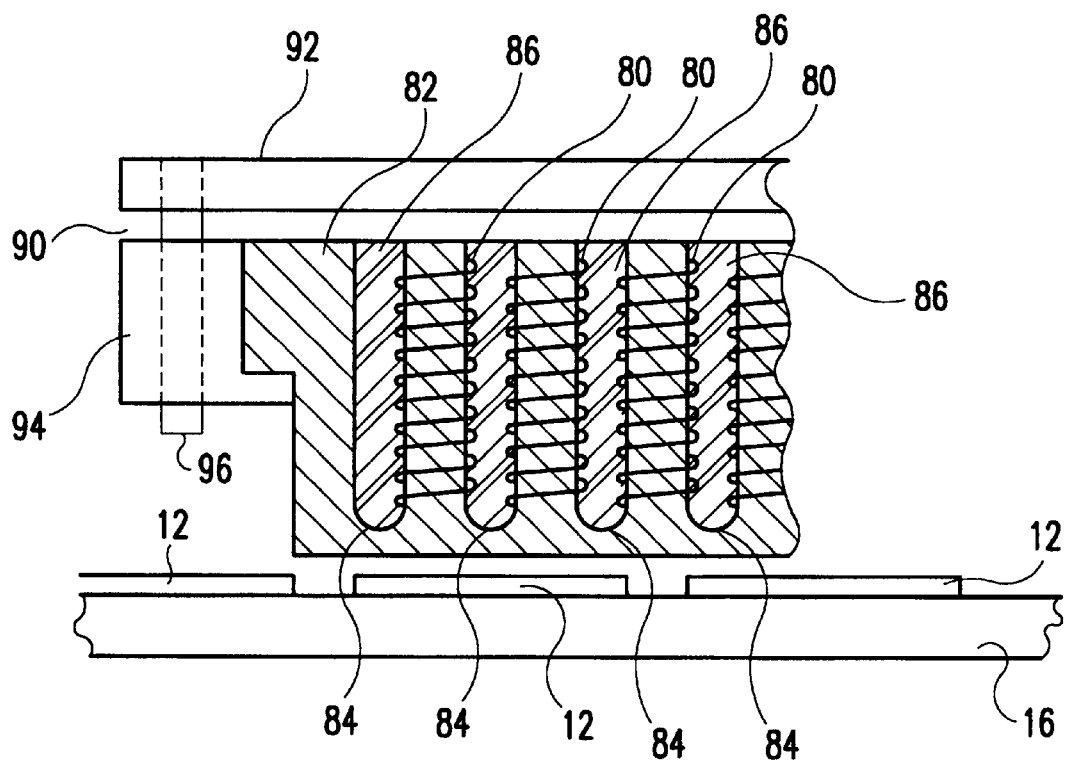
FIG. 6 is a fragmentary side view, with part in section, of an alternate armature design for use in the practice of the invention.
Figure 25:
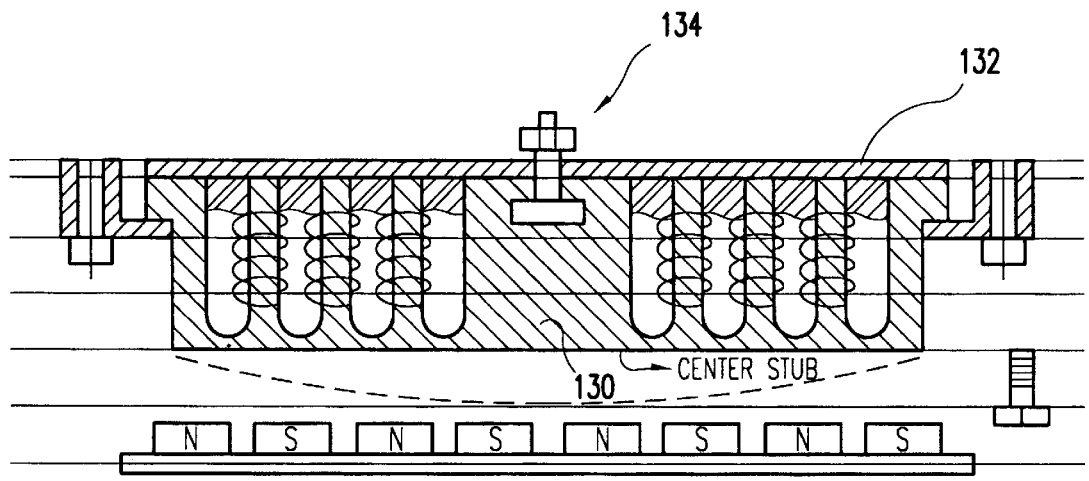
FIG. 25 is a sectional view, similar to FIG. 6, showing an alternate embodiment of the invention shown in FIG. 6.

Referring now to FIG. 25, in an alternate embodiment of the slider shown in FIG. 6, a central portion 130 of the armature structure is enlarged, and the back iron plate 132 is mechanically coupled to this central portion of the armature. In this specific embodiment, a bolt 134 attaches the back plate to the armature structure. This prevents or lessens a tendency of the armature to bow as a result of the magnetic forces.

Figure 26:
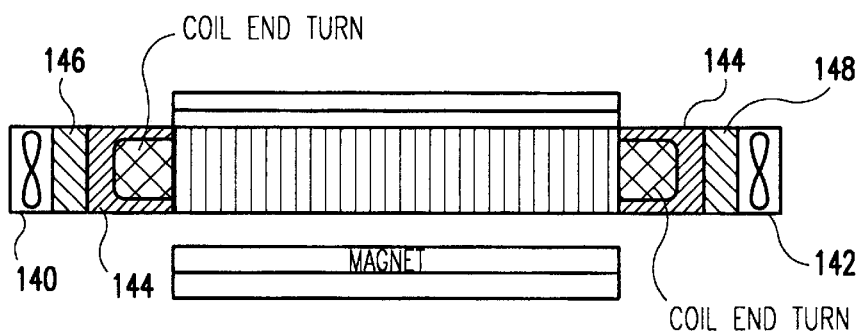
FIG. 26 is an end view of a linear motor slider shown in FIGS. 6 and 24 with improved heat dissipation from the end turns of the coils.

FIG. 26 shows, in a view along the longitudinal axis of the linear motor structure of FIGS. 6 and 25, the addition of fans 140 and 142, to remove heat from the coils via their end turns. As shown in prior embodiments of the invention, a thermally conductive resin 144 encapulates the end turns of the coils and thermally links the end turns to heat sinks 146 and 148 (e.g. aluminous blocks). The fans 140 and 142 are secured to the heat sink blocks 146 and 148 respectively.

While the invention has been described in terms of a single preferred embodiment, those skilled in the art will recognize that the invention can be practiced with modification within the spirit and scope of the appended claims.

Having thus described my invention, what we claim as new and desired to secure by Letters Patent is as follows:

1. A slider assembly for a brushless linear motor, comprising in combination:
   a metal base;
   an armature coil having two legs and an end turn joining said legs;
   a recess formed in said metal base, said recess having a bottom surface and an interior wall surface shaped so as to conform the shape of the end turn of an armature coil disposed in said recess with a gap between the end turn and said interior wall;
   a metal cover disposed over said armature coil end turn;
   a gap between the bottom surface of said recess and said end turn, and a gap between the interior surface of said cover and said end turn; and
   a heat conducting resin disposed in each said gap.

2. A slider assembly as in claim 1 wherein said metal base plate includes an upstanding post in said recess extending between opposing legs of said coil.

3. A armature assembly as in claim 1 further including a plurality of electrically insulating spacers in said recess to maintain each said gap prior to said heat conducting resin being disposed in each said gap.

4. A slider assembly as in claim 1 wherein said base plate and said cover plate are heat sinks.

5. A slider assembly as in claim 4 wherein base plate and said cover plate include heat conducting fins.

6. A slider assembly as in claim 5 wherein said heat conducting fins are orientated at right angles to the legs of said coils.

7. A slider assembly as in claim 6 further including an outboard heat sink attached to said base plate and said cover plate with outboard heat conducting fins orientated at right angles to the heat conducting fins on said base plate and said cover plate, and a fan attached to said assembly to force air across said outboard fins.

8. A slider assembly as in claim 7 wherein said fan forces air across said outboard fins through a gap in said outboard fins.

9. A slider assembly for a brushless, linear motor comprising in combination:
- a slider comprised of a plurality of coils embedded in a cast resin plate;
- a het sink attached to said plate; and
- a thermoelectric cooling rod embedded in said plate for conducting heat from said coils to said heat sink.

10. A slider assembly for a brushless, linear motor, comprising in combination:
- a slider comprised of a plurality of coils embedded in a cost resin plate;
- a thermoelectric cooler attached to said plate.

* * * * *